Nov. 20, 1945.  V. R. EVANS  2,389,423
FISHING LURE
Filed June 23, 1944
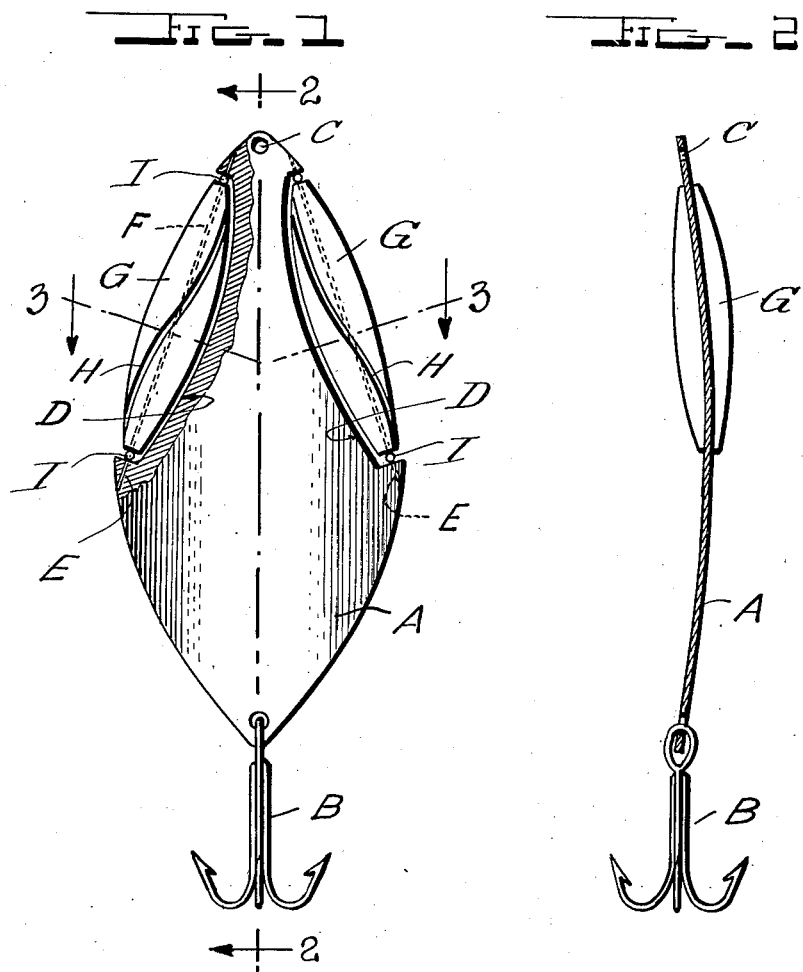
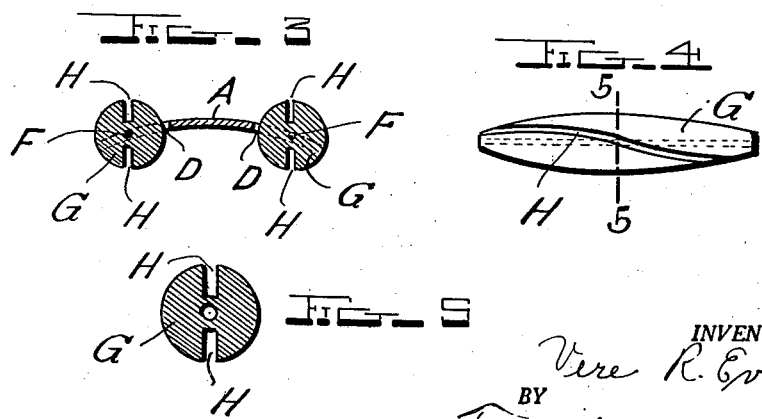
INVENTOR,
Vere R. Evans
BY Frank S. Appleman,
attorney Patented Nov. 20, 1945

2,389,423

UNITED STATES PATENT OFFICE 2,389,423

FISHING LURE

Vere R. Evans, Bemidji, Minn.

Application June 23, 1944, Serial No. 541,721

1 Claim. (Cl. 43—42)

This invention relates to fishing lures, and more particularly to those which are commonly known as spoons and plugs which are usually cast by rod and reel or are trolled.

It is an object of the invention to provide a lure of the character stated, provided with means for increasing the visibility and movement of the lure or portions thereof and, to that end, members which are movable with respect to the body of the lure are mounted on the body and preferably in recesses formed in the body of the lure, in order that the said members may have an external contour approximating the lines of the body so that the members will not have parts which project beyond the surface of the body that might be fouled by vegetation or other objects in the water through which the lure is moving.

It is a further object of the invention to provide mountings for the movable parts and on which the said movable parts rotate; means also being provided on the mountings for engaging the ends of the rotating members for minimizing friction, due to the rotation of the members, and it is the purpose of the inventor to so decorate the rotating members that they may reflect light and appear bright, although the colors and decorative scheme may be variously modified as is the custom in the decoration of the surfaces of lures now in common use.

It is a still further object of the invention to provide a lure having the characteristics indicated, in which the attachments to the body comprise comparatively few, inexpensive parts that have proven efficient and satisfactory in use.

With the foregoing and other objects in view, the invention consists in the details of construction, and in the arrangement and combination of parts to be hereinafter more fully set forth and claimed.

In describing the invention in detail, reference will be had to the accompanying drawing forming part of this application wherein like characters denote corresponding parts in the several views, and in which—

Figure 1 illustrates a plan view of a lure, partly in section, with the movable members mounted thereon;

Figure 2 illustrates a plan view of the lure, in a position at right angles to that in which it is shown in Fig. 1;

Fig. 3 illustrates a sectional view of the lure on the line 3—3 of Fig. 1;

Figure 4 illustrates a view in elevation of a rotary member; and

Figure 5 illustrates a sectional view on the line 5—5 of Fig. 4.

In the drawing A denotes the body of a lure which has the characteristics of an ordinary spoon, with hooks B connected to the body at one end, and provided with an eye C for attachment of a fishing line. The edges of the body near the front end thereof are recessed as at D, and the end edges of each recess have apertures such as E, in which the ends of a shaft F are lodged. A rotating member G is mounted on each shaft and each rotating member has a spiral slot or channel H in order to cause rotary movement of the member when the lure is drawn through the water. It is shown that the rotary member tapers toward its ends so that the end of the member does not project beyond the edges of the body, this arrangement preventing the existence of extensions beyond the edges of the body that might form lodgments for grass or foreign substances through which the lure is propelled.

Anti-friction balls I are interposed between the ends of the members G and the ends of the recesses to minimize friction due to the rotation of the said members.

The rotating members are shown as tapering toward their ends, and preferably the ends are of a size so that they do not protrude beyond the general surfaces of the lure or, in other words, they are of a size that they lie within the confines of the ends of the recesses so that there are no projections which would engage vegetation or other foreign matter in the water which might tend to foul the plug.

By inspecting the drawing, it is seen that the spoon-like body has its edges flared from the front end to approximately the central section and that the edges converge toward the rear. The recesses are diagonally disposed with relation to the line of travel of the lure and the rotatable groove members have their surfaces exposed practically throughout their lengths to the resistance of the water as the lure is propelled and therefore the rotatable members by reason of their cam grooves are positively rotated.

I claim:

In a fishing lure, a spoon-like body comprising a dished plate having edges diverging from its front end to approximately its transverse medial plane and converging therefrom to the rear end, the edges of the plate adjacent the front end being recessed, shafts extending substantially longitudinally of the lure through the recessed portions and anchored in the plate at the ends of the recesses, and members rotatably mounted on the shafts, each of said members having an external surface flared from the front end thereof to about the transverse medial plane thereof and tapered therefrom to the rear end, the surface of each of the rotatable members having an outline in substantial conformation to the outline of the edge of the front portion of the plate, and each of said members having curved grooves the surfaces of which form cams resistant to water pressure.

VERE R. EVANS.